United States Patent
Che

(10) Patent No.: US 11,023,124 B1
(45) Date of Patent: Jun. 1, 2021

(54) PROCESSING USER INPUT RECEIVED DURING A DISPLAY ORIENTATION CHANGE OF A MOBILE DEVICE

(71) Applicant: MOTOROLA MOBILITY LLC, Chicago, IL (US)

(72) Inventor: Wenlong Che, Naperville, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/719,926

(22) Filed: Dec. 18, 2019

(51) Int. Cl.
 *G06F 3/0488* (2013.01)
 *G06F 1/16* (2006.01)

(52) U.S. Cl.
 CPC .......... *G06F 3/0488* (2013.01); *G06F 1/1626* (2013.01)

(58) Field of Classification Search
 CPC ............................. G06F 3/0488; G06F 1/1626
 See application file for complete search history.

(56) References Cited

U.S. PATENT DOCUMENTS

| | | | | |
|---|---|---|---|---|
| 7,978,182 | B2* | 7/2011 | Ording | H04M 1/72522 345/173 |
| 9,348,455 | B2* | 5/2016 | Kitatani | G06F 3/0416 |
| 9,779,481 | B2* | 10/2017 | Yuasa | G06F 3/14 |
| 10,031,586 | B2* | 7/2018 | Touloumtzis | G06F 3/017 |
| 10,146,354 | B2* | 12/2018 | Kim | H04M 1/72469 |
| 10,775,896 | B2* | 9/2020 | Lee | G06F 3/017 |
| 2008/0211778 | A1* | 9/2008 | Ording | H04M 1/72403 345/173 |
| 2010/0007603 | A1* | 1/2010 | Kirkup | H04M 1/72427 345/158 |
| 2012/0223892 | A1* | 9/2012 | Matsubara | G06F 1/1626 345/173 |
| 2013/0002565 | A1* | 1/2013 | Tumanov | G06F 1/1626 345/173 |
| 2013/0053007 | A1* | 2/2013 | Cosman | H04W 4/21 455/414.3 |
| 2013/0069988 | A1* | 3/2013 | Kamei | G06F 1/1637 345/658 |
| 2013/0154951 | A1* | 6/2013 | Laibowitz | G06F 3/0346 345/173 |
| 2013/0201113 | A1* | 8/2013 | Hinckley | G06F 3/0487 345/173 |
| 2013/0222275 | A1* | 8/2013 | Byrd | G06F 3/0488 345/173 |

(Continued)

*Primary Examiner* — Grant Sitta
(74) *Attorney, Agent, or Firm* — Isidore PLLC

(57) ABSTRACT

A method, a mobile device, and a computer program product for processing user input received during a display orientation change of a mobile device. The method includes determining if touch screen data is received during a re-orientation of a display of the mobile device from a first mode to a second mode. In response to determining that touch screen data was received during the re-orientation, the method further includes identifying whether the touch screen data includes at least one user interface action having a corresponding response by/on the mobile device. In response to the touch screen data including the at least one user interface action and in response to completion of a re-orientation of the display of the mobile device from the first mode to the second mode, the at least one user interface action is executed to trigger the corresponding response by/on the mobile device.

20 Claims, 6 Drawing Sheets

(56) References Cited

U.S. PATENT DOCUMENTS

| | | | | |
|---|---|---|---|---|
| 2014/0132514 A1* | 5/2014 | Kuzara | ................ | G06F 1/3215 345/158 |
| 2014/0160078 A1* | 6/2014 | Seo | .................... | G06F 11/3058 345/175 |
| 2014/0210708 A1* | 7/2014 | Simmons | ................. | G09G 5/00 345/156 |
| 2014/0219520 A1* | 8/2014 | Myers | ................ | G06K 9/00087 382/124 |
| 2014/0320434 A1* | 10/2014 | Pantel | ................ | G06F 3/04883 345/173 |
| 2015/0135108 A1* | 5/2015 | Pope | .................. | A63F 13/2145 715/767 |
| 2015/0365306 A1* | 12/2015 | Chaudhri | ............ | G06F 3/0484 715/736 |
| 2015/0378520 A1* | 12/2015 | Chandrasekaran | ... | G06F 3/0482 715/716 |
| 2016/0147313 A1* | 5/2016 | Higashitani | ......... | G06F 3/04883 345/173 |
| 2017/0097692 A1* | 4/2017 | Furukawa | ............ | G06F 3/0488 |

* cited by examiner

PROCESSING USER INPUT RECEIVED DURING A DISPLAY ORIENTATION CHANGE OF A MOBILE DEVICE

BACKGROUND

1. Technical Field

The present disclosure generally relates to electronic devices and in particular to processing user input received during a display orientation change of a mobile device.

2. Description of the Related Art

Modern personal devices, such as cell phones, are used to watch videos and other media on a display screen. The display screen typically incorporates a touch screen that allows a user to provide input by touching areas of the display. When the personal device is rotated, the display orientation changes based on data received from a motion sensor. If the display is in a portrait mode and the personal device is rotated a sufficient amount along the X-Y coordinate plane, the display changes orientation to a landscape mode. Similarly, if the display is in a landscape mode and the personal device is rotated a sufficient amount along the X-Y coordinate plane, the display changes orientation to a portrait mode. Unfortunately, some personal devices and operating systems ignore touch screen input during the process of re-orienting the display. Touch inputs that occur during the display re-orientation process are then lost.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
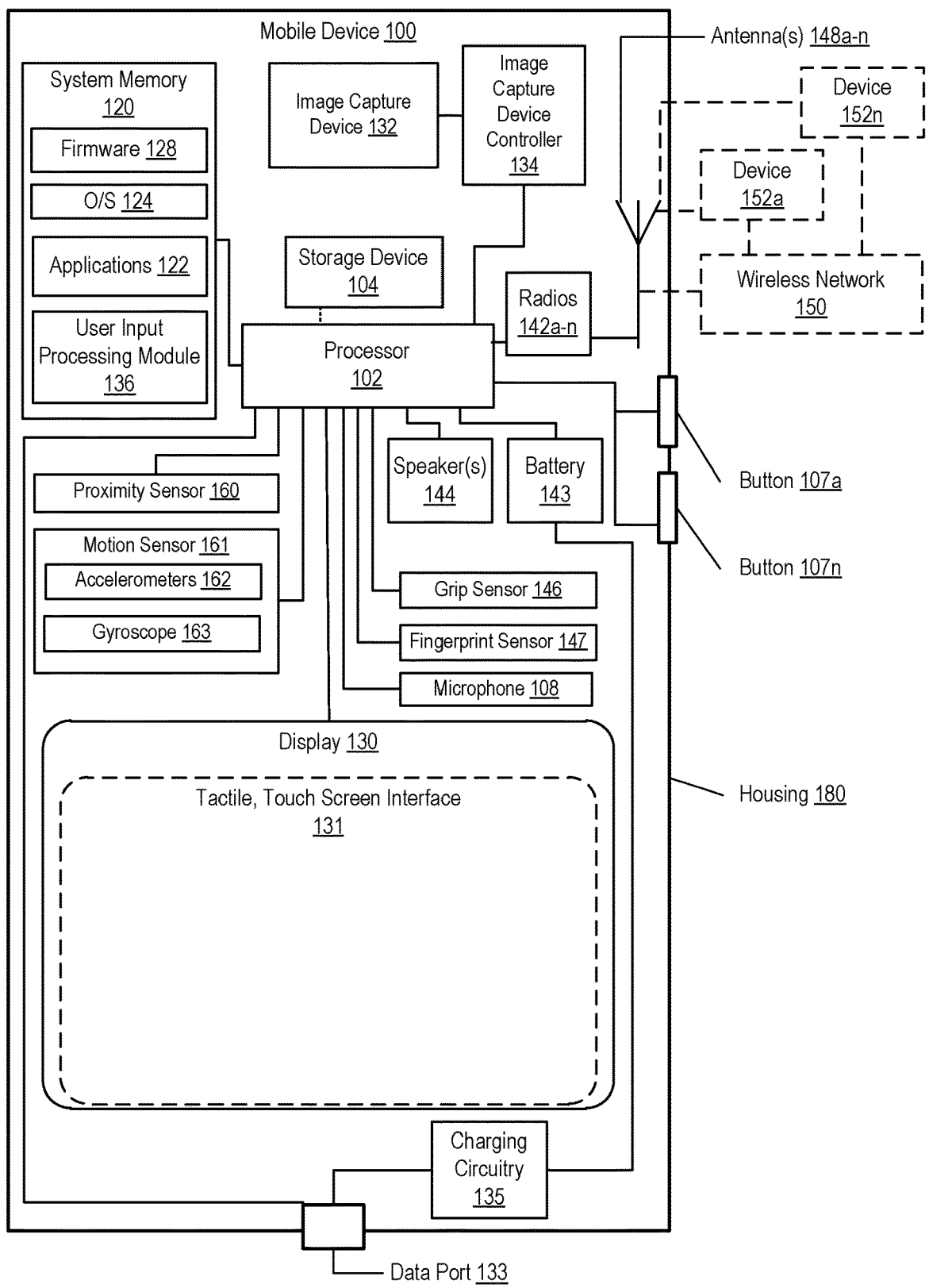
FIG. 1 depicts an example mobile device within which various aspects of the disclosure can be implemented, according to one or more embodiments.

The illustrative embodiments provide a method, a mobile device, and a computer program product for processing user input received during an orientation change of a mobile device display. The method includes determining, via a processor of a mobile device, if touch screen data is received during a re-orientation of a display of the mobile device from a first mode to a second mode. In response to determining that touch screen data was received during the re-orientation, the method further includes identifying, from the touch screen data, whether the touch screen data comprises at least one user interface action having a corresponding response by/on the mobile device. In response to the touch screen data comprising the at least one user interface action and in response to completion of a re-orientation of the display of the mobile device from the first mode to the second mode, the method further includes executing the at least one user interface action to trigger the corresponding response by/on the mobile device.

According to another embodiment, a mobile device comprises a memory, a display including a touch screen interface, and at least one processor communicatively coupled to the memory, the display, and the touch screen interface. The memory has a user input processing module stored thereon for processing user input received during a display orientation change. The at least one processor executes program code of the user input processing module, which causes the mobile device to determine if touch screen data is received during a re-orientation of the display from a first mode to a second mode. In response to determining that touch screen data was received during the re-orientation, the mobile device further identifies, from the touch screen data, whether the touch screen data comprises at least one user interface action having a corresponding response by/on the mobile device. In response to the touch screen data comprising the at least one user interface action and in response to completion of a re-orientation of the display of the mobile device from the first mode to the second mode, the mobile device executes the at least one user interface action to trigger the corresponding response by/on the mobile device.

According to an additional embodiment, a computer program product includes a computer readable storage device with program code stored thereon which, when executed by one or more processors of a mobile device having a display including a touch screen interface and a memory, makes the mobile device complete the functionality of determining if touch screen data is received during a re-orientation of the display of the mobile device from a first mode to a second mode. In response to determining that touch screen data was received during the re-orientation, the computer program product further causes the mobile device to identify, from the touch screen data, whether the touch screen data comprises at least one user interface action having a corresponding response by/on the mobile device. In response to the touch screen data comprising the at least one user interface action and in response to completion of a re-orientation of the display of the mobile device from the first mode to the second mode, the computer program product further causes the mobile device to execute the at least one user interface action to trigger the corresponding response by/on the mobile device.

The above contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the following figures and the remaining detailed written description. The above as well as additional objectives, features, and advantages of the present disclosure will become apparent in the following detailed description.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within mobile device 100 are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

FIG. 1 depicts example mobile device 100 within which various aspects of the disclosure can be implemented, according to one or more embodiments. Examples of such mobile devices include, but are not limited to, a notebook computer, a mobile phone, a digital camera, and a tablet computer, etc. Mobile device 100 includes processor 102, which is communicatively coupled to storage device 104, system memory 120, display 130, and image capture device controller 134.

System memory 120 may be a combination of volatile and non-volatile memory, such as random access memory (RAM) and read-only memory (ROM). System memory 120 can store program code or similar instructions associated with firmware 128, an operating system 124, applications 122, and user input processing module 136. Although depicted as being separate from the applications 122, user input processing module 136 may also be implemented as an application. Processor 102 loads and executes program code stored in system memory 120. Examples of program code that may be loaded and executed by processor 102 include program code associated with applications 122 and program code associated with user input processing module 136.

In one embodiment, image capture device 132 is communicatively coupled to image capture device controller 134, which is communicatively coupled to processor 102. Image capture device 132 can capture images that are within the field of view of image capture device 132.

Mobile device 100 can further include data port 133 coupled with processor 102, charging circuitry 135, and battery 143. Mobile device 100 further includes microphone 108, one or more speakers 144, and one or more buttons 107a-n. Buttons 107a-n may provide controls for volume, power, and a camera. Mobile device 100 further includes radios 142a-n, which are coupled to antennas 148a-n. In this example, radios 142a-n and antennas 148a-n allow mobile device 100 to communicate wirelessly with devices 152a-n via wireless network 150.

Display 130 can be one of a wide variety of display screens or devices, such as a liquid crystal display (LCD) and an organic light emitting diode (OLED) display. In the illustrated embodiments, display 130 is a touch screen device that includes a tactile, touch screen interface 131 that allows a user to provide tactile/touch input to or control mobile device 100 by touching the display screen.

Mobile device 100 further includes proximity sensor 160 and motion sensor(s) 161. Motion sensor(s) 161 can include one or more accelerometers 162 and gyroscope 163. Proximity sensor 160 can be an infrared (IR) sensor that detects the presence of a nearby object. Motion sensor(s) 161 can detect movement of mobile device 100 and provide motion data to processor 102 that indicate the spatial orientation and movement of mobile device 100. Accelerometers 162 measure linear acceleration of movement of mobile device 100 in multiple axes (X, Y and Z). For example, accelerometers 162 can include three accelerometers, where one accelerometer measures linear acceleration in the X axis, one accelerometer measures linear acceleration in the Y axis, and one accelerometer measures linear acceleration in the Z axis. Gyroscope 163 measures rotation or angular rotational velocity of mobile device 100.

Accelerometers 162 measure the difference between linear acceleration in the accelerometer's reference frame and the earth's gravitational field vector. In one embodiment, accelerometers 162 can be piezoelectric devices or micro electro-mechanical systems (MEMS) that convert mechanical motion into an electrical signal. This electrical signal can be processed to determine orientation. In the absence of linear acceleration, the accelerometer output is a measurement of the rotated gravitational field vector. Multiple accelerometers can be used to determine orientation of a device in yaw, pitch and roll orientation angles. Accelerometers 162 provide vector data for each axis that includes a magnitude of acceleration and the direction of the acceleration. In one embodiment, the magnitude output from accelerometers 162 can be in units of meters per second squared. Vector algebra can be used to calculate corresponding orientation angles in yaw, pitch and roll of mobile device 100 based on the accelerometer data.

Mobile device 100 further includes other sensor components such as grip sensors 146 and fingerprint sensor 147. Grip sensors 146 are pressure or tactile sensors that are arranged on the peripheral edge of housing 180 of mobile device 100. Grip sensors 146 measure the force applied by a user's hand to the housing 180. Fingerprint sensor 147 can scan the finger of a user and generate fingerprint data corresponding to the user's fingerprint. A user places his/her finger over the fingerprint sensor in order to initiate scanning of the fingerprint. Fingerprint sensor 147 can be used to identify a user of mobile device 100 and allow or deny access to mobile device 100.

Figure 2:
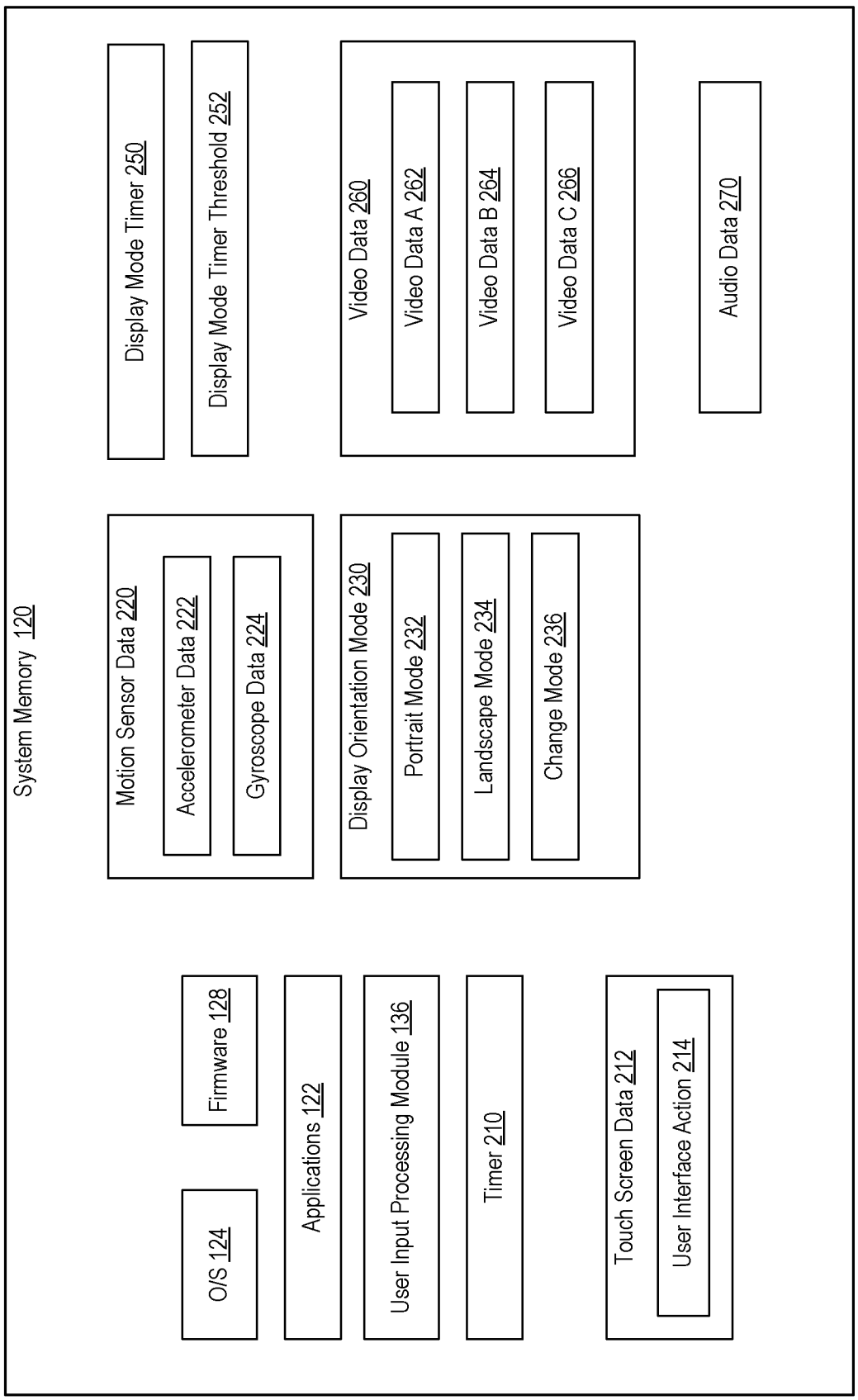
FIG. 2 is a block diagram of example contents of the system memory of a mobile device that enables processing of user input during device re-orientation, according to one or more embodiments.

In the description of each of the following figures, reference is also made to specific components illustrated within the preceding figure(s). With reference now to FIG. 2, one embodiment of example contents of system memory 120 of mobile device 100 is shown. System memory 120 includes data, software, and/or firmware modules, including applications 122, operating system 124, firmware 128, and user input processing module 136. User input processing module 136 enables user input to touch screen interface 131 during an orientation change of display 130. In one embodiment, user input processing module 136 performs the processes presented in the flowcharts of FIGS. 4-6, as will be described below.

System memory 120 further includes timer 210 (i.e., code providing functionality of a timer) and touch screen data 212. Timer 210 tracks the current time. Touch screen data 212 contains touch screen data received from touch screen interface 131. Touch screen data 212 includes user interface action 214. User interface action 214 is a selection inputted by a user via touch screen interface 131 that instructs processor 102 to perform a specific action. In one example embodiment, user interface action 214 can be activated by a user selection, via touch screen interface 131, of an icon shown on display 130.

System memory 120 further includes motion sensor data 220. Motion sensor data 220 comprises data received from motion sensor 161. Motion sensor data 220 includes accelerometer data 222 received from accelerometers 162 and gyroscope data 224 received from gyroscope 163. Accelerometer data 222 contains linear acceleration values in multiple axes (X, Y, and Z) for a period of time. After the period of time, the values are written over with new linear acceleration values. Gyroscope data 224 contains rotation or angular rotational velocity values for a period of time. After the period of time, the values are written over with new rotation or angular rotation velocity values. In one embodiment, motion sensor data 220 can be used to determine whether mobile device 100 is being rotated from a portrait orientation to a landscape orientation or from a landscape orientation to a portrait orientation.

System memory 120 further includes display orientation mode 230. Display orientation mode 230 is the current rotational mode or position that is shown on display 130. Display orientation mode 230 can be one of portrait mode 232, landscape mode 234 and change mode 236. Mobile device 100 can use motion sensor data 220 to determine whether display 130 should be in portrait mode 232 or landscape mode 234, based on the rotational position of mobile device 100. Change mode 236 is on when the display orientation is in the process of being changed from one orientation to a different orientation; otherwise change mode 236 is off.

System memory 120 further includes display mode timer 250 and display mode timer threshold 252. Display mode timer 250 tracks a time period that display 130 is in the same display mode (i.e., portrait mode 232 or landscape mode 234). Display mode timer threshold 252 is a pre-determined amount of time that display 130 is in the same orientation mode. Display mode timer threshold 252, when exceeded, indicates that display 130 has been in the same orientation mode for an extended period of time. In one example, display mode timer threshold 252 can be two minutes. In one embodiment, when display mode timer threshold 252 is exceeded, program code that controls the re-orientation of display 130 between portrait and landscape modes will have stopped executing, which results in a delay occurring in a next re-orienting of the display while the program code is restarted.

System memory 120 also includes video data 260 and audio data 270. Video data 260 can be a wide variety of video or video images that can be shown on display 130. For example, video data 260 can include movies, music videos, video clips, streaming video, and any other moving visual media. Video data 260 includes video data A 262, video data B 264, and video data C 266. In one example embodiment, video data B 264 can include video data without a user interface action 214 and video data C 266 can include video data with a user interface action 214. Audio data 270 can be played on speaker 144.

Figure 3A:
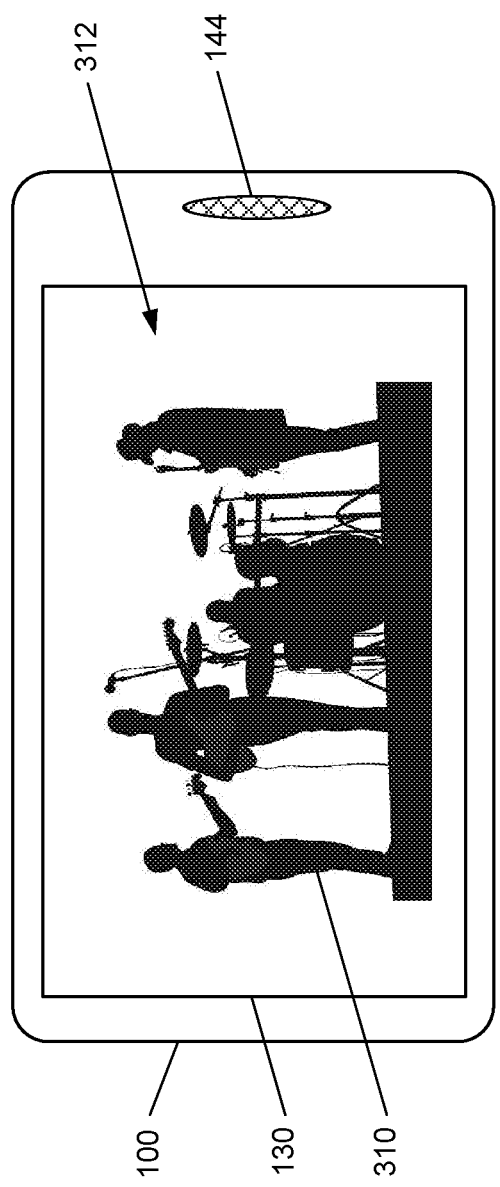
FIG. 3A is an example illustration of a mobile device with a display positioned in a landscape orientation and on which a music video is being displayed, according to one or more embodiments.
Figure 3B:
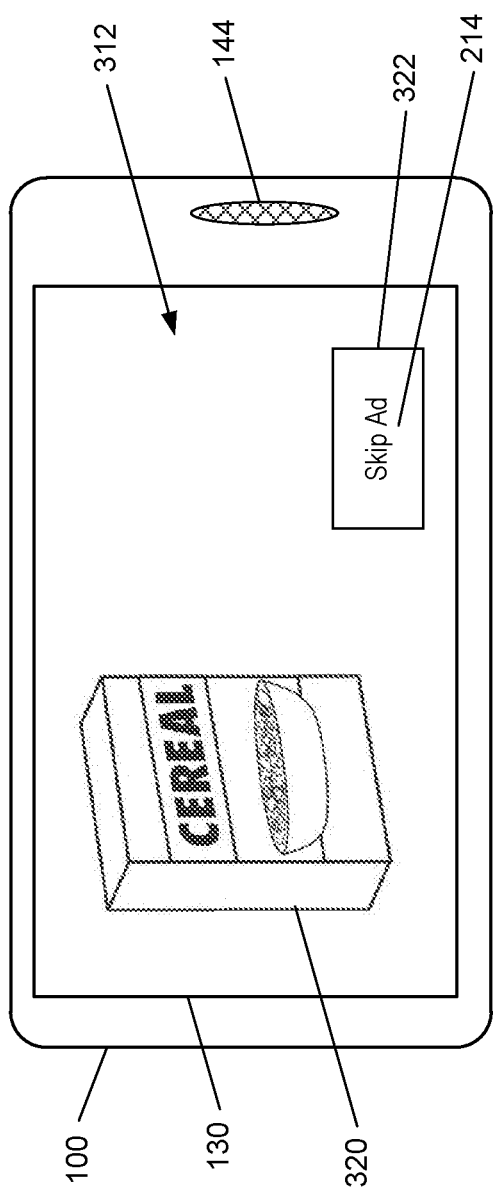
FIG. 3B is an example illustration of a mobile device with a display positioned in a landscape orientation and on which an advertisement is being displayed, according to one or more embodiments.
Figure 3C:
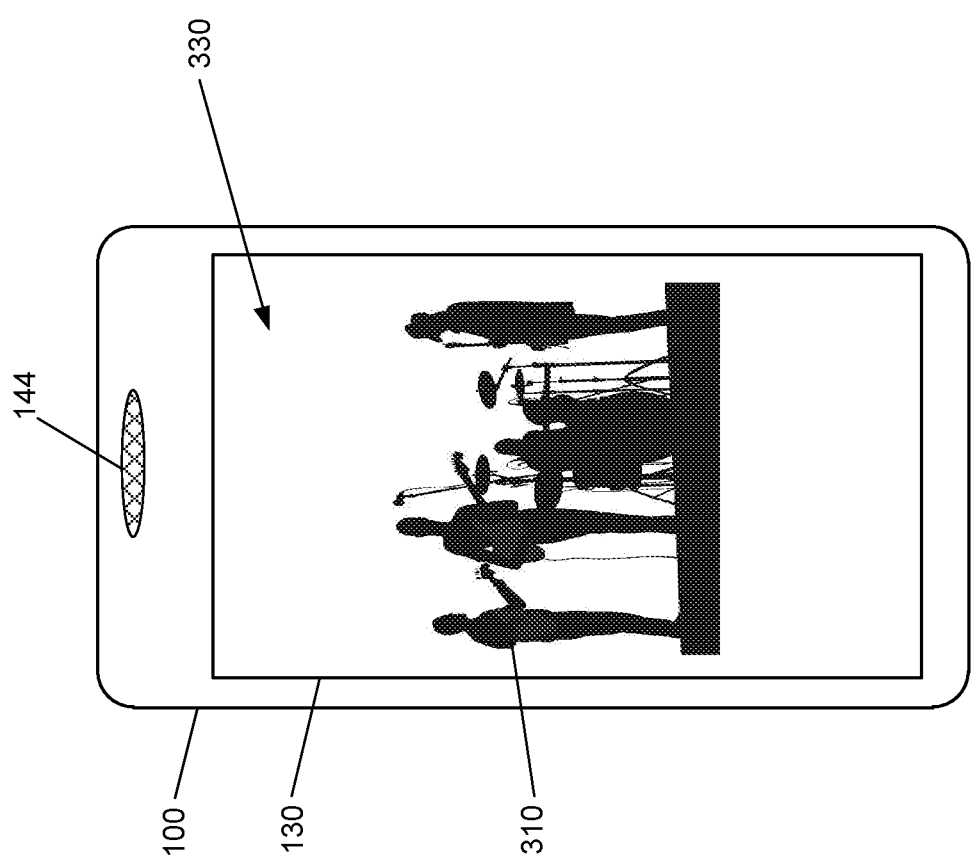
FIG. 3C is an example illustration of a mobile device with a display positioned in a portrait orientation and on which a music video is being displayed, after the advertisement of FIG. 3B has been skipped, according to one or more embodiments.

FIGS. 3A, 3B and 3C illustrate a sequence of display contents of mobile device 100 initially showing a music video from a video streaming service on display 130 in a landscape mode (FIG. 3A), then showing an advertisement video 320 on display 130 in a landscape mode with a skip ad icon 322 to stop the advertisement (FIG. 3B), and then showing the music video on display 130 in a portrait mode after the advertisement has been stopped (FIG. 3C).

Specifically, FIG. 3A illustrates an example of mobile device 100 playing a music video 310 from a video streaming service on display 130 in a landscape mode or landscape orientation 312. At the same time, audio data 270 associated with the music video can be played on speaker 144.

Turning to FIG. 3B, after a period of time playing music video 310, some video streaming services will temporarily interrupt showing the music video and will transmit an advertisement video 320. At the same time the video is playing, audio data associated with the advertisement video 320 will be played on speaker 144. In FIG. 3B, the advertisement is for a breakfast cereal brand. After a period of time playing advertisement video 320 (e.g., 10 seconds), some video streaming services will allow a user to skip the advertisement and return to the music video 310 by showing a skip ad icon 322 with the advertisement video 320. When the skip ad icon 322 is selected by a user via touch screen interface 131, a user interface action 214 is generated for processor 102 (FIG. 3B) to execute.

With reference to FIG. 3C, frequently when using a mobile device, a user may rotate mobile device 100, causing display 130 to change orientation from landscape mode to portrait mode 343. According to one embodiment, in response to the skip ad icon 322 (FIG. 3B) being selected by the user during the device orientation change from landscape mode to portrait mode 330, the advertisement is discontinued, and music video 310 resumes and is displayed on display 130 of mobile device 100 in portrait mode 330.

In one embodiment, processor 102, executing user input processing module 136, can determine whether touch screen data 212 is received during a re-orientation of display 130 of mobile device 100 from landscape mode 312 to portrait mode 310. In response to determining that touch screen data 212 was received during the re-orientation, processor 102 identifies, from touch screen data 212, whether the touch screen data 212 comprises at least one user interface action 214 having a corresponding response by/on mobile device 100. Processor 102 can identify the user interface action 214 in response to the position/location of the touch input received from the user. In response to the touch screen data 212 including the at least one user interface action 214 and in response to (or at the time of or following) completion of a re-orientation of display 130 of the mobile device from landscape mode 312 to portrait mode 310, or vice-versa, processor 102 executes the at least one user interface action 214 to trigger the corresponding response by/on mobile device 100. Accordingly, in the present example, a touch input selection of the skip function (e.g., touch input received at or above the screen location of the skip ad icon 322) will result in the advertisement being halted and the original content resuming the video streaming.

According to one aspect, the present disclosure can eliminate unwanted advertisements that pop up on the display when a video is playing in first mode (e.g., landscape mode) and the user wants to stop the unwanted advertisement in the first mode before the user re-orients the device. The present disclosure allows user touch events to register immediately following the touch event and not be discarded, even though the display orientation is changing or rotating. In the illustrated embodiment, after rotation of the display is completed, the user interface action executes to discontinue or remove the advertisement and resume the previous video.

Figure 4:
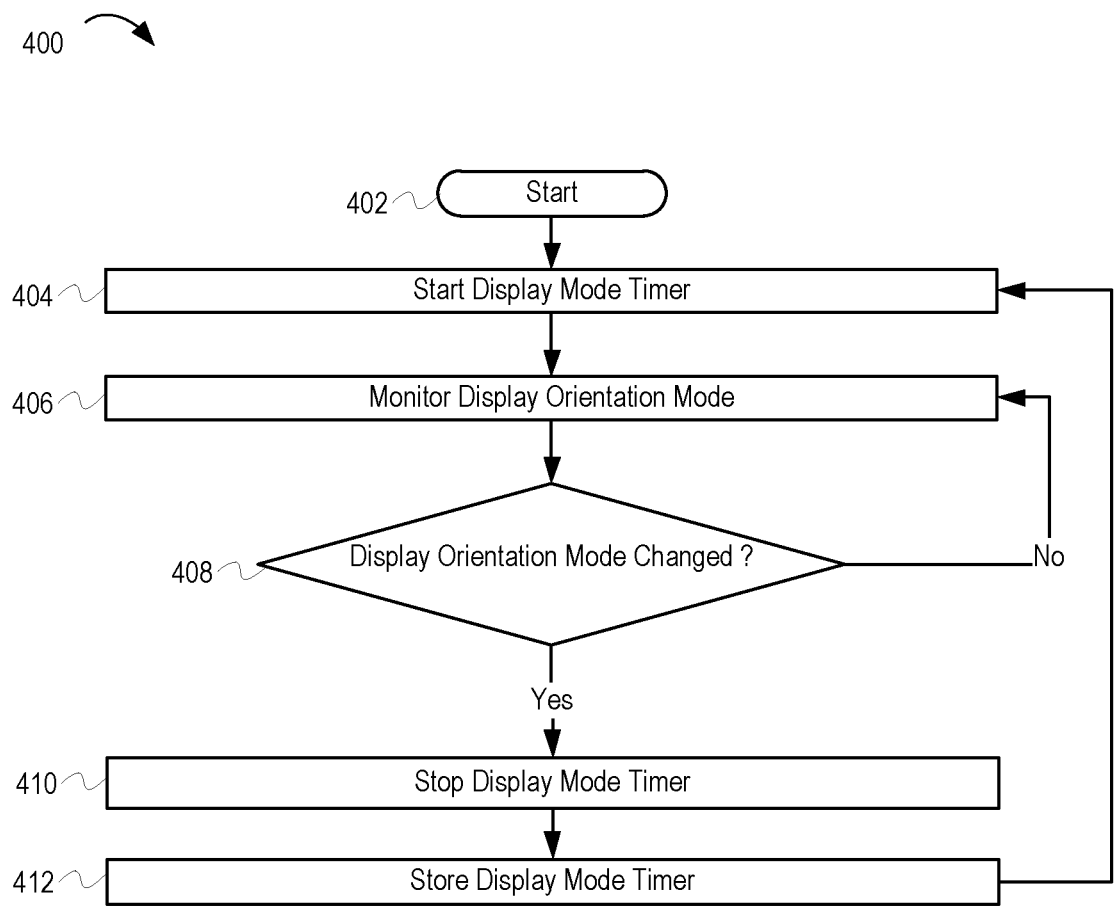
FIG. 4 depicts a flowchart of a method of tracking how long a display has been in an orientation mode, according to one or more embodiments.
Figure 5:
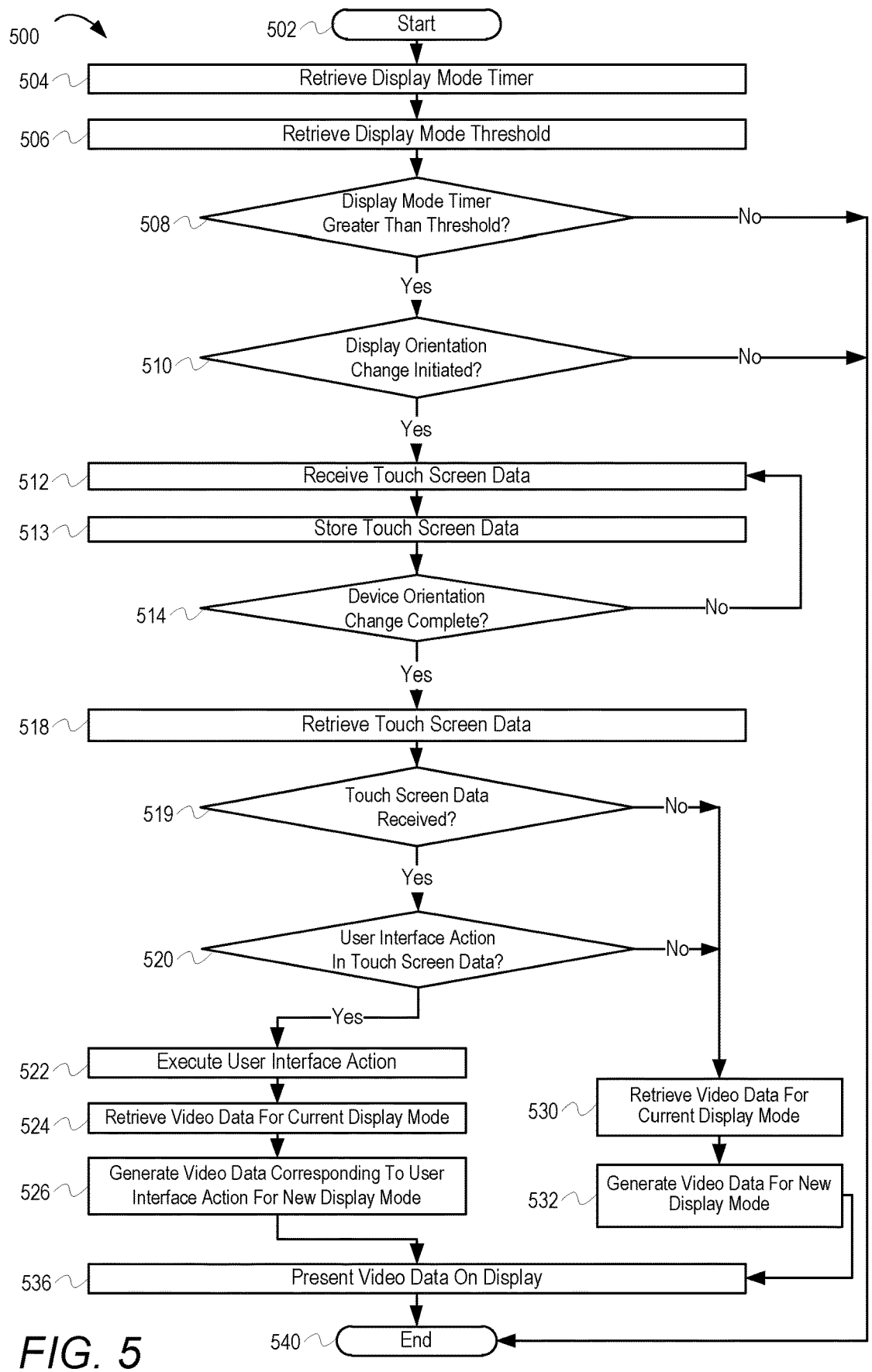
FIG. 5 depicts a flowchart of a method of processing user input received during a display orientation change of a mobile device and subsequent application of the user input following completion of the orientation change of the mobile device, according to one or more embodiments.

FIGS. 4 and 5 depict methods 400 and 500 for processing user input received during a display orientation change of a mobile device. The description of methods 400 and 500 will be described with reference to the components and examples of FIGS. 1-3C. The operations depicted in FIGS. 4 and 5 can be performed by mobile device 100 or other suitable devices. For example, one or more of the processes of the methods described in FIGS. 4 and 5 may be performed by a processor (e.g., processor 102) executing program code associated with user input processing module 136.

FIG. 4 illustrates a method 400 for tracking how long display 130 has been in an orientation mode (portrait or landscape). Method 400 begins at start block 402. At block 404, processor 102 starts display mode timer 250. In one embodiment, display mode timer 250 is started each time mobile device 100 starts or is awakened from a sleep state or following a completion of a re-orientation of the display. Processor 102 monitors or checks the current display orientation mode 230 of display 130 (block 406). At decision block 408, processor 102 determines if the display orientation mode 230 has been changed. In one embodiment, processor 102 can determine if a change to the display orientation mode 230 has occurred based on detecting a change to the display orientation mode from landscape mode 234 to portrait mode 232 or from portrait mode 232 to landscape mode 234.

In response to determining that the display orientation mode 230 has not been changed, processor 102 returns to block 406, to continue monitoring display orientation 230 and determining if the display orientation mode has been changed. In response to determining that the display orientation mode has been changed, processor 102 stops display mode timer 250 (block 410) and stores a value of display mode timer 250 to system memory 120 (block 412). The value of display mode timer 250 will subsequently be used in the method of FIG. 5. Processor 102 then returns to block 404 to re-start display mode timer 250.

FIG. 5 illustrates a method 500 for processing user input received during a display orientation change of mobile device 100. Method 500 begins at start block 502. At block 504, processor 102 retrieves the stored value of display mode timer 250. Processor 102 retrieves display mode timer threshold 252 (block 506). At decision block 508, processor 102 determines if stored/retrieved value of display mode timer 250 is greater than display mode timer threshold 252. In response to determining that the retrieved value of display mode timer 250 is not greater than display mode timer threshold 252, method 500 terminates at end block 540.

According to one aspect, when the time value of display mode timer 250 is less than the threshold 252, the processor is still running the previous instantiation of the re-orientation module that tracks touch inputs occurring during the previous re-orientation. Thus, any new touch input will continue to be recorded by the processor for execution of the associated process once the re-orientation of the device is completed.

In response to determining that display mode timer 250 is greater than display mode timer threshold 252, processor 102 determines if a change to the display orientation mode 230 has been initiated (decision block 510). In one embodiment, processor 102 can determine if a change to the current display orientation mode 230 has been initiated based on detecting a change to the current display orientation mode from landscape mode 234 to portrait mode 232 or from portrait mode 232 to landscape mode 234. In response to determining that a change to the display orientation mode 230 has not been initiated, method 500 ends at end block 540.

In response to determining that a change to the display orientation mode 230 has been initiated, processor 102 monitors for and receives touch screen data 212 from touch screen interface 131 (block 512) and stores touch screen data 212 to system memory 120 (block 513). At decision block 514, processor 102 determines if the change to the display orientation mode 230 has been completed. In response to determining that the change to the display orientation mode 230 has not been completed, processor 102 returns to block 512 to continue receiving touch screen data 212.

In response to determining that the change to the display orientation mode 230 has been completed, processor 102 retrieves touch screen data 212 from system memory 120 (block 518). At decision block 519, processor 102 determines if any touch screen data 212 has been received while display 130 is re-orientating. In response to determining that touch screen data 212 has not been received, processor 102 retrieves video data A 262 for the current display orientation mode (i.e., landscape mode) (block 530). Processor 102 generates video data B 264 for the new display orientation mode (i.e., portrait mode) (block 532). Processor 102 presents video data B 264 on display 130 in the new display orientation mode (i.e., portrait mode) (block 536). Method 500 then ends at end block 540.

In response to determining that touch screen data 212 has been received, processor 102 identifies if touch screen data 212 contains at least one user interface action 214 (decision block 520). In response to identifying that touch screen data 212 does not contain at least one user interface action 214, processor 102 retrieves video data A 262 for the current display orientation mode (e.g., landscape mode) (block 530). Processor 102 generates video data B 264 for the new display orientation mode (i.e., portrait mode) without the user interface action (block 532). Processor 102 presents video data B 264 on display 130 in the new display orientation mode (e.g., portrait mode) (block 536). Method 500 then ends at end block 540.

In response to identifying that touch screen data 212 contains at least one user interface action 214, processor 102 executes the user interface action 214 (block 522). In one example embodiment, the user interface action 214 can discontinue an advertisement being shown during music video. Processor 102 retrieves video data A 262 for the current display orientation mode (i.e., landscape mode) (block 524). Processor 102 generates video data C 266 for the new display orientation mode (i.e., portrait mode) with the user interface action 214 incorporated or applied to the original video data A (block 526). Processor 102 presents video data C 266 on display 130 in the new display orientation mode (i.e., portrait mode) (block 536). Method 500 then terminates at end block 540.

In the above-described methods of FIGS. 4 and 5, one or more of the method processes may be embodied in a computer readable device containing computer readable code such that operations are performed when the computer readable code is executed on a computing device. In some implementations, certain operations of the methods may be combined, performed simultaneously, in a different order, or omitted, without deviating from the scope of the disclosure. Further, additional operations may be performed, including operations described in other methods. Thus, while the method operations are described and illustrated in a particular sequence, use of a specific sequence or operations is not meant to imply any limitations on the disclosure. Changes may be made with regards to the sequence of operations without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special-purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

As used herein, the term "or" is inclusive unless otherwise explicitly noted. Thus, the phrase "at least one of A, B, or C" is satisfied by any element from the set {A, B, C} or any combination thereof, including multiples of any element.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

What is claimed is:

1. A method comprising:
    determining, via a processor of a mobile device, if touch screen data is received within original video data after initiation of a re-orientation of a display of the mobile device from a first mode to a second mode, while the re-orientation is in progress;
    in response to determining that touch screen data was received while the re-orientation is in progress, identifying, from the touch screen data, whether the touch screen data comprises at least one user interface action having a corresponding response by/on the mobile device; and
    in response to the touch screen data comprising the at least one user interface action and in response to completion of the re-orientation of the display of the mobile device from the first mode to the second mode, executing the at least one user interface action to trigger the corresponding response by/on the mobile device, with the at least one user interface action incorporated or applied based on a location in the original video data.

2. The method of claim 1, wherein: the at least one user interface action is associated with touch input received at a specific display location while the display is orientated in the first mode; and the executing of the at least one user interface action comprising identifying a user interface action based on the specific display location of the touch input received relative to the display being oriented in the first mode.

3. The method of claim 1, further comprising:
    retrieving first video data for the first mode;
    generating second video data for the second mode, the second video data including the at least one user interface action; and
    presenting the second video data on the display.

4. The method of claim 1, further comprising:
    in response to identifying that the touch screen data does not include at least one user interface action,
    retrieving first video data for the first mode;
    generating third video data for the second mode; and
    presenting the third video data on the display.

5. The method of claim 1, further comprising:
    storing, to a memory, the touch screen data received during the re-orientation change of the display.

6. The method of claim 1, further comprising:
    prior to determining if touch screen data has been received during the re-orientation of the display, retrieving a display mode timer;
    retrieving a display mode time threshold;
    determining if the display mode timer is greater than the display mode time threshold; and
    in response to determining that the display mode timer is greater than the display mode time threshold, determining if touch screen data has been received during the re-orientation of the display.

7. The method of claim 1, further comprising:
    starting a display mode timer;
    determining if the display orientation has changed;
    in response to determining that the display orientation has changed, ending the display mode timer; and
    storing, to a memory, the display mode timer.

8. A mobile device comprising:
    a memory having stored thereon a user input processing module for processing user input received during a display orientation change;
    a display including a touch screen interface; and
    at least one processor communicatively coupled to the memory, the display and the touch screen interface, the at least one processor executing program code of the user input processing module which enables the mobile device to:
        determine if touch screen data is received within original video data after initiation of a re-orientation of the display from a first mode to a second mode, while the re-orientation is in progress;
        in response to determining that touch screen data was received while the re-orientation is in progress, identify, from the touch screen data, whether the touch screen data comprises at least one user interface action having a corresponding response by/on the mobile device; and
        in response to the touch screen data comprising the at least one user interface action and in response to completion of the re-orientation of the display of the mobile device from the first mode to the second mode, execute the at least one user interface action to trigger the corresponding response by/on the mobile device, with the at least one user interface action incorporated or applied based on a location in the original video data.

9. The mobile device of claim 8, wherein: the at least one user interface action is associated with touch input received at a specific display location while the display is orientated in the first mode; and the executing of the at least one user interface action comprises the at least one processor identifying a user interface action based on the specific display location of the touch input received relative to the display being oriented in the first mode.

10. The mobile device of claim 8, wherein the processor is further enabled to:
    retrieve first video data for the first mode;
    generate second video data for the second mode, the second video data including the at least one user interface action; and
    present the second video data on the display.

11. The mobile device of claim 8, wherein the processor is further enabled to:
  in response to identifying that the touch screen data does not include at least one user interface action, retrieve first video data for the first mode;
  generate third video data for the second mode; and
  present the third video data on the display.

12. The mobile device of claim 8, wherein the processor is further enabled to:
  store, to a memory, the touch screen data received during the re-orientation change of the display.

13. The mobile device of claim 8, wherein the processor is further enabled to:
  prior to determining if touch screen data has been received during the re-orientation of the display, retrieve a display mode timer;
  retrieve a display mode time threshold;
  determine if the display mode timer is greater than the display mode time threshold; and
  in response to determining that the display mode timer is greater than the display mode time threshold, determine if touch screen data has been received during the re-orientation of the display.

14. The mobile device of claim 8, wherein the processor is further enabled to:
  start a display mode timer;
  determine if the display orientation has changed;
  in response to determining that the display orientation has changed, end the display mode timer; and
  store, to a memory, the display mode timer.

15. A computer program product comprising:
  a non-transitory computer readable storage device with program code stored thereon which, when executed by one or more processors of a mobile device having, a display including a touch screen interface and a memory, enables the mobile device to complete the functionality of:
    determining if touch screen data is received within original video data after initiation of a re-orientation of the display of the mobile device from a first mode to a second mode, while the re-orientation is in progress;
    in response to determining that touch screen data was received while the re-orientation is in progress, identifying, from the touch screen data, whether the touch screen data comprises at least one user interface action having a corresponding response by/on the mobile device; and
    in response to the touch screen data comprising the at least one user interface action and in response to completion of the re-orientation of the display of the mobile device from the first mode to the second mode, executing the at least one user interface action to trigger the corresponding response by/on the mobile device, with the at least one user interface action incorporated or applied based on a location in the original video data.

16. The computer program product of claim 15, wherein: the at least one user interface action is associated with touch input received at a specific display location while the display is orientated in the first mode; and the executing of the at least one user interface action comprising identifying a user interface action based on the specific display location of the touch input received relative to the display being oriented in the first mode.

17. The computer program product of claim 15, wherein the program code for processing user input received during a display orientation change comprises program code that further enables the mobile device to complete the functionality of:
  retrieving first video data for the first mode;
  generating second video data for the second mode, the second video data including the at least one user interface action; and
  presenting the second video data on the display.

18. The computer program product of claim 15, wherein the program code for processing user input received during a display orientation change comprises program code that further enables the mobile device to complete the functionality of:
  in response to identifying that the touch screen data does not include at least one user interface action,
  retrieving first video data for the first mode;
  generating third video data for the second mode; and
  presenting the third video data on the display.

19. The computer program product of claim 15, wherein the program code for processing user input received during a display orientation change comprises program code that further enables the mobile device to complete the functionality of:
  prior to determining if touch screen data has been received during the re-orientation of the display, retrieve a display mode timer;
  retrieve a display mode time threshold;
  determine if the display mode timer is greater than the display mode time threshold; and
  in response to determining that the display mode timer is greater than the display mode time threshold, determine if touch screen data has been received during the re-orientation of the display.

20. The computer program product of claim 15, wherein the program code for processing user input received during a display orientation change comprises program code that further enables the mobile device to complete the functionality of:
  starting a display mode timer;
  determining if the display orientation has changed;
  in response to determining that the display orientation has changed, ending the display mode timer; and
  storing, to a memory, the display mode timer.

* * * * *